(12) United States Patent
Rodriguez et al.

(10) Patent No.: US 11,934,845 B1
(45) Date of Patent: Mar. 19, 2024

(54) SYSTEMS AND METHODS FOR A STATE MACHINE CONFIGURATION ENGINE

(71) Applicant: United Services Automobile Association (USAA), San Antonio, TX (US)

(72) Inventors: Augusto Javier Rodriguez, San Antonio, TX (US); Jorge Arturo Vicens, Phoenix, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 67 days.

(21) Appl. No.: 17/538,636

(22) Filed: Nov. 30, 2021

(51) Int. Cl.

| | |
|---|---|
| *G06F 8/30* | (2018.01) |
| *G06F 8/34* | (2018.01) |
| *G06F 9/445* | (2018.01) |
| *G06F 9/448* | (2018.01) |
| *G06F 11/36* | (2006.01) |
| *G06Q 10/04* | (2023.01) |
| *G08C 19/28* | (2006.01) |
| *H04L 65/75* | (2022.01) |

(52) U.S. Cl.
CPC .............. *G06F 9/4498* (2018.02); *G06F 8/34* (2013.01); *G06F 9/44505* (2013.01); *G06F 11/3608* (2013.01); *G06Q 10/04* (2013.01); *G08C 19/28* (2013.01); *H04L 65/762* (2022.05)

(58) Field of Classification Search
CPC ...... G06F 9/4498; G06F 9/44505; G06F 8/34; G06F 11/3664; G06F 11/3606; G06F 11/3608; G06Q 10/64; G06Q 10/04; H04L 65/1104; H04L 9/40; H04L 63/06; H04L 67/564; H04L 65/762; G08C 19/28; H04N 21/4147

See application file for complete search history.

(56) References Cited

U.S. PATENT DOCUMENTS 10,810,110 B1 * 10/2020 Thomas .............. G06F 11/3664
11,080,065 B1 * 8/2021 Reshadi ................ H04L 67/564
11,169,908 B1 * 11/2021 Lu ........................ G06F 11/3608
(Continued)

OTHER PUBLICATIONS

Song Tian, WO 2008141519, (translation), Nov. 27, 2008, 34 pgs <WO_2008141519.pdf>.*

*Primary Examiner* — Tuan A Vu
(74) *Attorney, Agent, or Firm* — Fletcher Yoder, P.C.

(57) ABSTRACT

A system including a developer client computer configured to provide inputs to a state machine generation client to configure a state machine. The system further includes the state machine generation client configured to generate structural code and associated code implementation files representative of the state machine, where the state machine generation client comprises: a graphical user interface (GUI). The GUI includes a state machine configuration window displaying a configurable representation of one or more states in the state machine and an ordering of the states of the state machine and a state key listing the one or more states in the state machine. The system further includes a code implementation system coupled to a code repository, wherein the code implementation system is configured to generate a dynamic state machine implementation based at least upon the generated structural code and associated code implementation files.

19 Claims, 12 Drawing Sheets

(56) References Cited

U.S. PATENT DOCUMENTS

| | | | |
|---|---|---|---|
| 2003/0055919 A1* | 3/2003 | Fong | H04L 9/40 |
| | | | 709/221 |
| 2003/0234737 A1* | 12/2003 | Nelson | G08C 19/28 |
| | | | 341/176 |
| 2007/0112953 A1* | 5/2007 | Barnett | H04L 63/06 |
| | | | 709/224 |
| 2011/0110646 A1* | 5/2011 | Smith | H04N 21/4147 |
| | | | 386/E5.028 |
| 2014/0222890 A1* | 8/2014 | Zhu | H04L 65/1104 |
| | | | 709/203 |
| 2019/0364081 A1* | 11/2019 | Valenzuela | H04L 65/762 |
| 2021/0209505 A1* | 7/2021 | Crabtree | G06Q 10/04 |
| 2021/0232388 A1* | 7/2021 | Mirantes | G06F 9/44505 |

\* cited by examiner

```
202 ── "initial state" : ,
      "states" : [
          {
              "name" : "INITIAL_0" ,
              "target" :   "FORK_1" ,
              "stateType" : "ACTION" ,
              "event" : "initialized",
              "eventType" : "POSITIVE" ,
              "actions" : [
                  {
                      "process" : "init_begin" ,
                      "type" : "onEnter"
                  }
              ]
          } ,
204 <     {
              "name" : "Action_After_INIT" ,
              "target" :    "JUNCTION" ,
              "stateType" : "ACTION" ,
              "event" : "ActionAfterInit" ,
              "eventType" : "POSITIVE" ,
              "actions" : [
                  {
                      "process" : "Background_Check" ,
                      "type" : "onEnter"
                  } ,
                  {
                      "process" : "FailedCheck" ,
                      "type" : "onExit"
                  }
              ]
          } ,
      ] ,
      "junctions" : [
          {
              "name" : "JUNCTION" ,
              "guards" : [
206 <             {
                      "target" : "FORK" ,
                      "type" : "FIRST" ,
                      "process" : "Determine_Path" ,
                      "hasFailure" : false
                  }
              ]
          } ,
      "forks" : [
          {
              "name" : "FORKS" ,
              "guards" : [
208 <             {
                      "target" : "END" ,
                      "type" : "onEnter" ,
                      "process" : "Check_Complete" ,
                      "hasFailure" : false
                  } ,
210 ── "terminal state" : "END"
```

FIG. 10

SYSTEMS AND METHODS FOR A STATE MACHINE CONFIGURATION ENGINE

BACKGROUND

The present disclosure relates generally to building a state machine, and more specifically, to building a state machine via a graphical user interface and generating a corresponding state machine configuration, where the state machine configuration represents a workflow of the state machine.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

A state machine representation is a powerful tool for developers to develop complex applications with multiple different actions occurring throughout the application, where each action may execute upon certain parameters being fulfilled. In particular, coding libraries for state machines often provide developers with actions for building the actions of the state machine. However, the structure of state machines are often complex with multiple interconnected segments of code and highly complicated actions that are executed during different states within the state machine. This may lead developers to spend extra time fine-tuning the details of the implementation of the state machine and testing the structure of the state machine before implementing the actions of the state machine. As such, improved systems and methods for automatically generating a state machine configuration from a simplified workflow may be desired.

SUMMARY OF EMBODIMENTS

Embodiments provided herein enable a code designer to create a state machine via graphical representations of states and configurations. A code generation engine and interface may provide developers with the ability to create a conceptual workflow of the state machine using one or more building blocks of the workflow. Once a workflow of the state machine is created visually in the interface, the code generation engine may normalize the workflow into a computer-readable medium and generate the state machine code and associated code implementation skeletons that may be dropped into a programming environment to implement the entire machine. In this manner, the developers may insert code into the code implementation skeleton associated with the workflow with the knowledge that the workflow of the state machine is functional and interchangeable.

DRAWINGS

These and other features, aspects, and advantages of the present disclosure will become better understood when the following detailed description is read with reference to the accompanying drawings in which like characters represent like parts throughout the drawings, wherein:

FIG. 10 illustrates example generated code for the example state machine configuration, in accordance with an embodiment;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed above, developers creating a state machine may face challenges implementing the state machine. One of these challenges may involve creating the structure of the state machine in code. Re-arranging the structure of the state machine in code may additionally lead to hours of coding, testing, and troubleshooting. Furthermore, correctly implementing transitions between different states and the actions that occur at particular points of time within the state machine may further complicate the implementation of the state machine.

To remedy this, a code generation engine and interface may provide the developers with the ability to create a conceptual workflow of the state machine using one or more building blocks of the workflow. Once a workflow of the state machine is created visually in the interface, the code generation engine may normalize the workflow into a computer-readable medium and generate the state machine code and associated code implementation skeletons that may be dropped into a programming environment to implement the entire machine. This way, the service code may be dynamically inserted into the code implementation skeleton associated with the workflow with the knowledge that the workflow of the state machine is functional and interchangeable.

Figure 1:
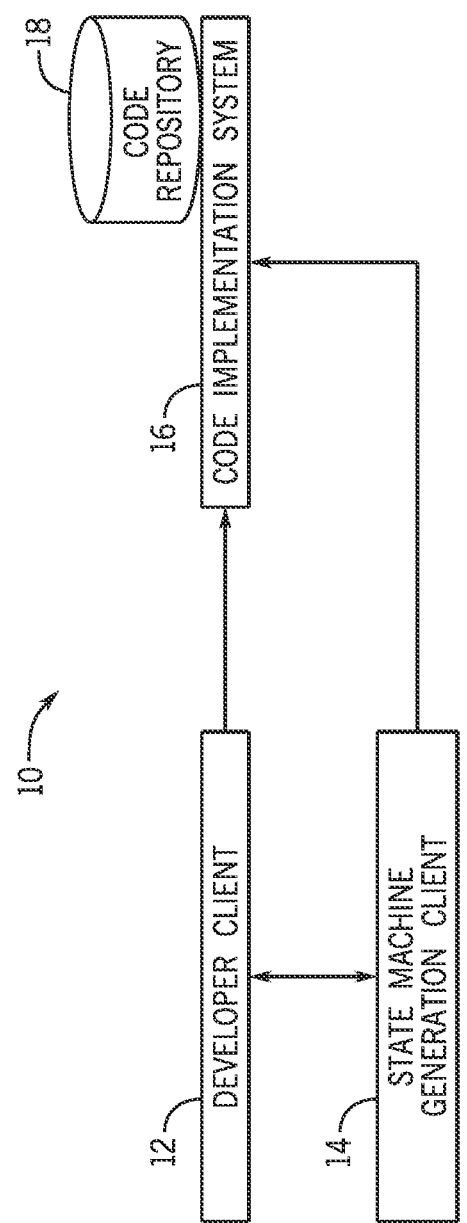
FIG. 1 illustrates a system for generating and implementing a state machine configuration, in accordance with an embodiment.

With the foregoing in mind, FIG. 1 illustrates a system 10 for generating and implementing a state machine configuration. The system 10 may include a developer client computer 12, where the developer client computer 12 may be used by one or more developers to create an application. The developer client computer 12 may include code libraries with different routines and/or subroutines related to one or more actions executing during a state in the state machine. These code libraries may include already created and tested code for implementing the application.

The developer client computer 12 may establish a connection to a state machine generation client computer 14 (or in some instances may be the same computer). The developer client computer 12 may be located on the same network as the state machine generation client computer 14. In some embodiments, the state machine generation client computer 14 may be located on a remote network interfacing with a network running the developer client computer 12, or vice-versa. The state machine generation client computer 14 may define and generate a state machine. The state machine generation client computer 14 may provide a graphical user interface (GUI) to receive user inputs and may include a code generation engine to generate structural code representing a structure of the state machine based on the user inputs and/or one or more associated code implementation files. For example, the GUI may provide an interface for defining a structure of states of the state machine. The structure may be used to generate a state machine skeleton, which may include the state machine states, flows, and references to processing code at each state. The one or more associated code implementation files may include the processing code with the routines and/or subroutines referenced by each state during execution of the state machine. That is, the processing code may be inserted into the one or more associated code implementation files from a code repository. Furthermore, the one or more associated code implementation files may include a test file representative of each possible path of one or more pathways in a state machine, where each path is constructed based at least upon each input received at a respective state.

The developer client computer 12 may provide the user inputs to the GUI of the state machine generation client computer 14. Moreover, the state machine generation client computer 14 may provide feedback to the developer client computer 12 based on the user inputs. The system 10 may further include a code implementation system 16 with a code repository 18 for implementing the state machine. The code implementation system 16 may be located on the same computer and/or network as the state machine generation client computer 14 and/or the developer client computer 12.

In some embodiments, the code implementation system 16 may be located on a remote network. The code implementation system 16 may receive the generated code from the state machine generation client computer 14. Furthermore, the developer client computer 12 may provide the code libraries to the code repository 18.

The code implementation system 16 may use the code repository 18 to insert routines and/or subroutines into correct locations in the generated code implementation files associated with the structural code of the state machine. In some embodiments, the code implementation system 16 may be communicatively coupled to an exterior, third-party code repository and receive the routines and/or subroutines.

Figure 2:
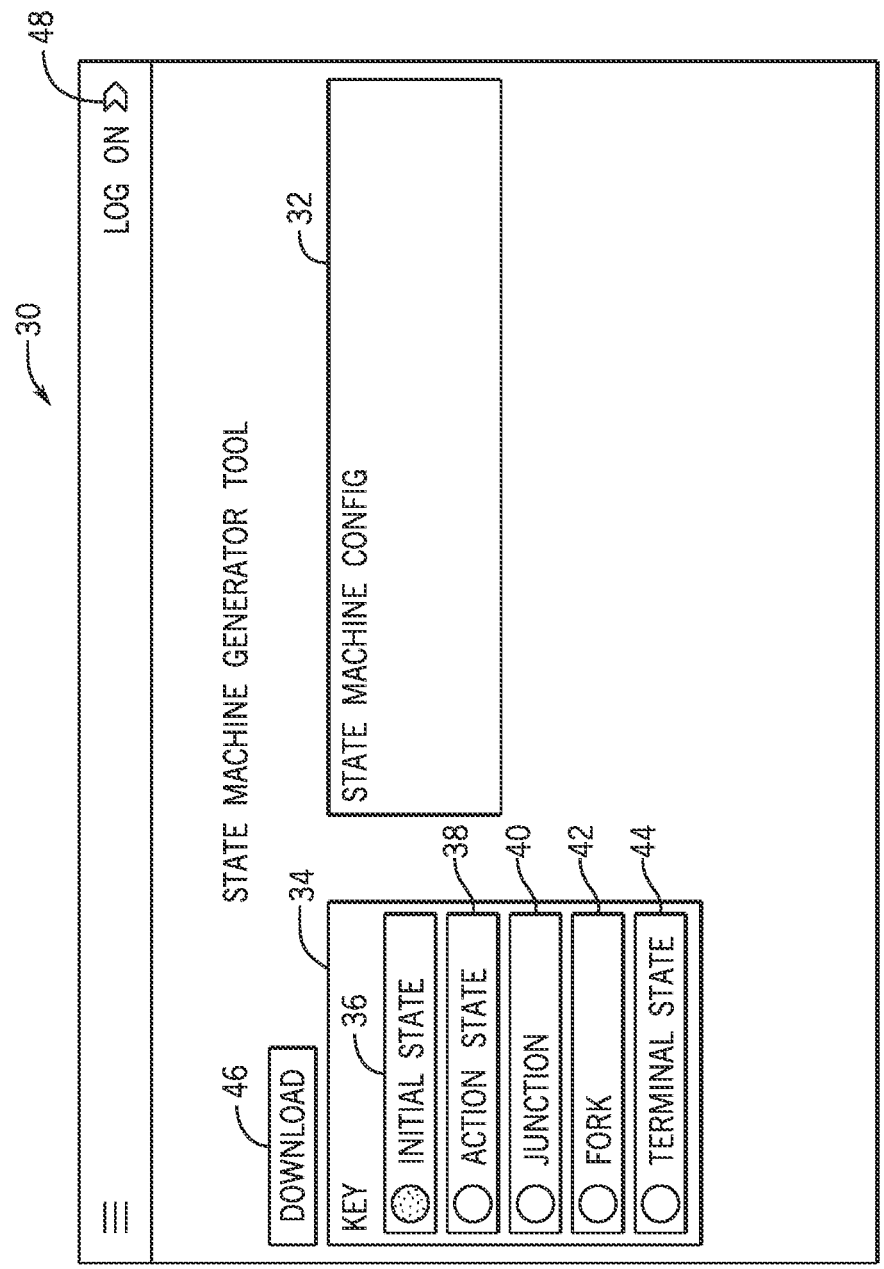
FIG. 2 illustrates a graphical user interface (GUI) of a state machine generation client, in accordance with an embodiment.

As discussed above, the state machine generation client computer 14 may allow a developer to configure and generate a state machine configuration. With the foregoing in mind, FIG. 2 is an illustration of a graphical user interface (GUI) 30 of the state machine generation client computer 14, which, in some embodiments, may be rendered by the developer client computer 12. As discussed in more detail below, the GUI 30 may include graphical interactive elements, supplied by the state machine generation client computer 14, enabling developer input for identifying states of a desired state machine.

The GUI 30 may include a state machine configuration window 32 for displaying a current representation of the state machine. As seen in FIG. 2, the state machine configuration window 32 may start initially in a blank state, as no states have been added to the state machine. As will be illustrated herein, the state machine configuration window 32 may begin to populate as states are added.

The GUI 30 may include a state key 34, indicating a particular type of state to be added to the desired state machine. The state key 34 provides selectable affordances for every state type available to the developer. For example, as depicted, the state key 34 may include an initial state 36, an action state 38, a junction 40, a fork 42, and/or a terminal state 44. Each state type in the state key 34 may include configuration options particular to its state type. In some embodiments, the state types may be selected by the developer via drag and drop into the state machine configuration window 32, to assemble the state machine. That is, the developer may drag and drop each desired state type into the state machine configuration window 32 to aggregate a desired variety of states that are assembled into the state machine. The developer may switch the order of the states by selecting and dragging the state to the desired location.

Turning to a brief definition of each of the state types, the initial state 36 is a first state of the state machine. It may initialize the state machine and indicate to a processor that the state machine is ready for execution. The initial state 36 may include one or more actions that are executed. The one or more actions may include one or more respective routines and/or subroutines. It should be noted that no states may be dropped in front of the initial state 36, as the initial state 36 is the beginning state for the state machine.

The action state 38 is a state where a routine and/or subroutine may be executed at a particular point in time during execution of the state machine. The action state 38 may execute the routine and/or subroutine on entrance into the state, on exit from the state, or transitioning within the state. The developer may add one or more action states 38 to the state machine when any such routines and/or subroutines are desired for execution.

The junction 40 is the state where a process is performed to determine which of a plurality of succeeding states the state machine should transition to next. That is, the junction 40 may have one or more processes to determine which succeeding state should be transitioned to after the junction 40. The junction 40 may transition to only one state at a time. If parameters for the process to transition to one state are not met, the state machine may move to the next process in the junction 40 to determine the state to transition to next.

The fork 42 is similar to the junction 40 in that it has multiple available succeeding states. However, the fork 42 differs from the junction 40 in that multiple succeeding states can be transitioned to on the exit from the fork 42. Thus, the fork 42 may be added to the state machine where the state machine may split off into two different paths/states. That is, the fork 42 may enable execution of multiple actions/states executing simultaneously or nearly simultaneously. In some embodiments, the one or more actions in the fork 42 may transition to the same end point, merging the state machine back into a single path.

The terminal state 44 is the final state of the state machine. The terminal state 44 may contain a routine and/or subroutine that is executed at a particular point in time during execution of the state machine. The terminal state 44 may execute the routine and/or subroutine on entrance into the state, on exit from the state, or transitioning within the state. No states may be added after the terminal state 44, as this state is used to complete execution of the state machine.

The GUI 30 may include an affordance to generate the structure of the state machine and one or more associated code implementation files (e.g., here illustrated as a download button 46). When selected, the affordance may initialize generating the structural code of the state machine based upon the state machine configuration definition defined by inputs to the GUI 30. The structure may be generated as structural code (computer-readable instructions) (e.g., a JSON file) that may be exported to a computer-readable medium, such as a data storage device or computer memory. Furthermore, the affordance may initialize generating the one or more associated code implementation files based upon the structural code and/or the state machine configuration definition. The associated code implementation files may be referenced by the structural code during execution of the state machine to implement the one or more actions for the one or more states of the state machine. That is, the associated code implementation files may include the processing code for each action executed during a respective state. In some embodiments, the GUI 30 may include a login selection 48, where the developers may enter their credentials and view previous and/or current state machine configurations. Furthermore, the GUI 30 may include an option to import previously generated structural code into the GUI 30 for editing and rework.

As discussed above, the state key 34 may include the initial state 36. Each state machine may necessitate the initial state 36 to be the first state placed before any other subsequent states are placed and configured. The initial state 36 is the first state of the state machine. It may initialize the state machine and indicate to a processor that the state machine is ready for execution. In some embodiments, when the initial state 36 is a required first state, the GUI 30 may automatically place the initial state 36 in the state machine configuration window 32 (or proximate to the state machine configuration window 32) indicating that it will be included as an initial state in the state machine. Further, in some embodiments when a terminal state 44 is required to end the state machine, the GUI 30 may automatically place the terminal state 44 in the state machine configuration window 32 (or proximate to the state machine configuration window 32) indicating that it will be includes as the last state in the state machine. In such embodiments, the state key 34 may refrain from displaying the initial state 36 and the terminal state 44 and allow the remaining states to be inserted between the initial state 36 and the terminal state 44.

Figure 3:
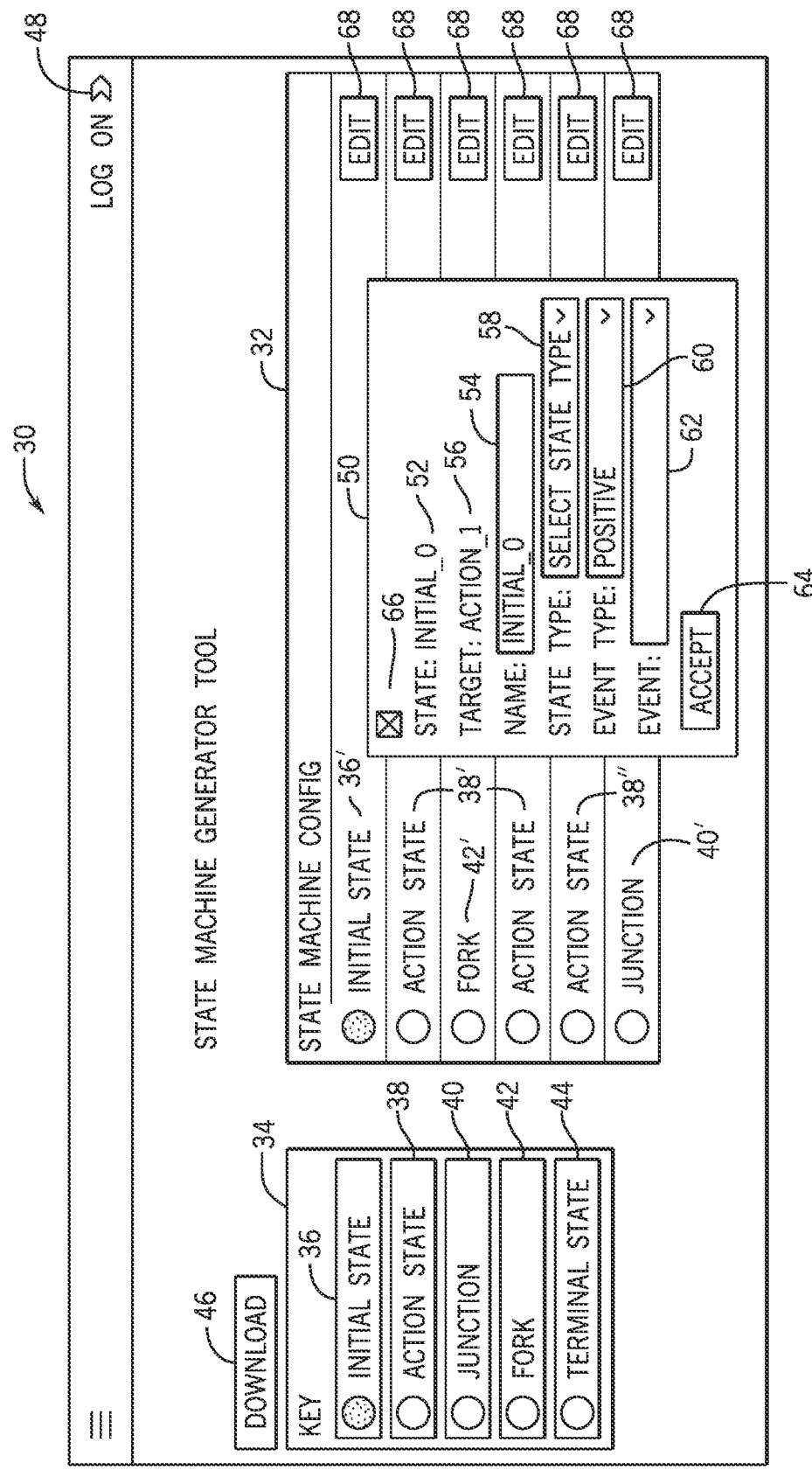
FIG. 3 illustrates an example initial state configuration window for an initial state of an example state machine configuration displayed in the GUI of the state machine generation client, in accordance with an embodiment.

With the foregoing in mind, FIG. 3 illustrates an example initial state configuration window 50 for populating configuration details of the initial state 36' (an actual initial state added to the state machine). The details illustrated in the initial state configuration window are one set of example state machine configuration inputs selected in the GUI 30 of the state machine generation client computer 14. As mentioned above, the initial state configuration window 50 may include multiple graphical interactive elements that help define the flow of the state machine with respect to the corresponding state. For example, the illustrated initial state configuration window 50 includes a state name 52 and a text field input element 54 to change the state name 52. In some embodiments, a default state name 52 is generated based on the existing state configuration. By way of example, the initial state 36 may have the name "INITIAL_0," which may be derived based upon the state type concatenated with an "_" and the state position within the state machine. For example, here the initial state is the first state in the state machine, represented by "0".

The illustrated initial state configuration window 50 also includes a target 56. The target 56 denotes a state that will succeed the current state. The target 56 may be manually and/or automatically set to a subsequent state in the state machine configuration. By way of example, in the illustrated state machine configuration of FIG. 3, the target 56 of the initial state 36' is the subsequent action state 38', which, using the nomenclature described above, has the name "Action_1". The target 56 may update based on any changes made to the state name 52 of a subsequent state. For example, if the developer changed the name of action state 38' to "1stAction", the target 56 would automatically change to "1stAction". Moreover, the target 56 may update automatically based on any re-arrangement of subsequent states. For example, if the fork action state 42' were moved above action state 38', the target 56 would automatically change to fork action state 42', as it would be next directly succeeding state after the initial state 36'.

The example initial state configuration window 50 may include a state type menu 58 with selection based interactive elements for selecting a type of state. The types of state may include, but are not limited to, action, fork, and junction states. In some embodiments, the type of state may be automatically selected to reflect which state from the state key 34 was selected when the state was added. However, because the initial state 36 is a special state indicating the start of the state machine, the state type menu 58 provides a mechanism to select whether the initial state is an action state 38, a junction 40, or a fork 42.

The example initial state configuration window 50 may include an event type menu 60 with selection based interactive elements for selecting a type of event. In some embodiments, the types of events may include a positive event or a negative event. The positive event is triggered upon a fulfillment of one or more parameters and the negative event is triggered upon lack of fulfillment of the one or more parameters.

Finally, the example initial state configuration window 50 may include a text field input element "Event" 62 to enter a name of an event that occurs when the initial state 36 is reached. The event, in some embodiments, may not be an actual process in code, instead serving as a benchmark to determine the current overall goal of the state. An "Accept"

button 64 may be selected to submit changes made to the configurations of the initial state and close the example initial state configuration window 50.

Figure 4:
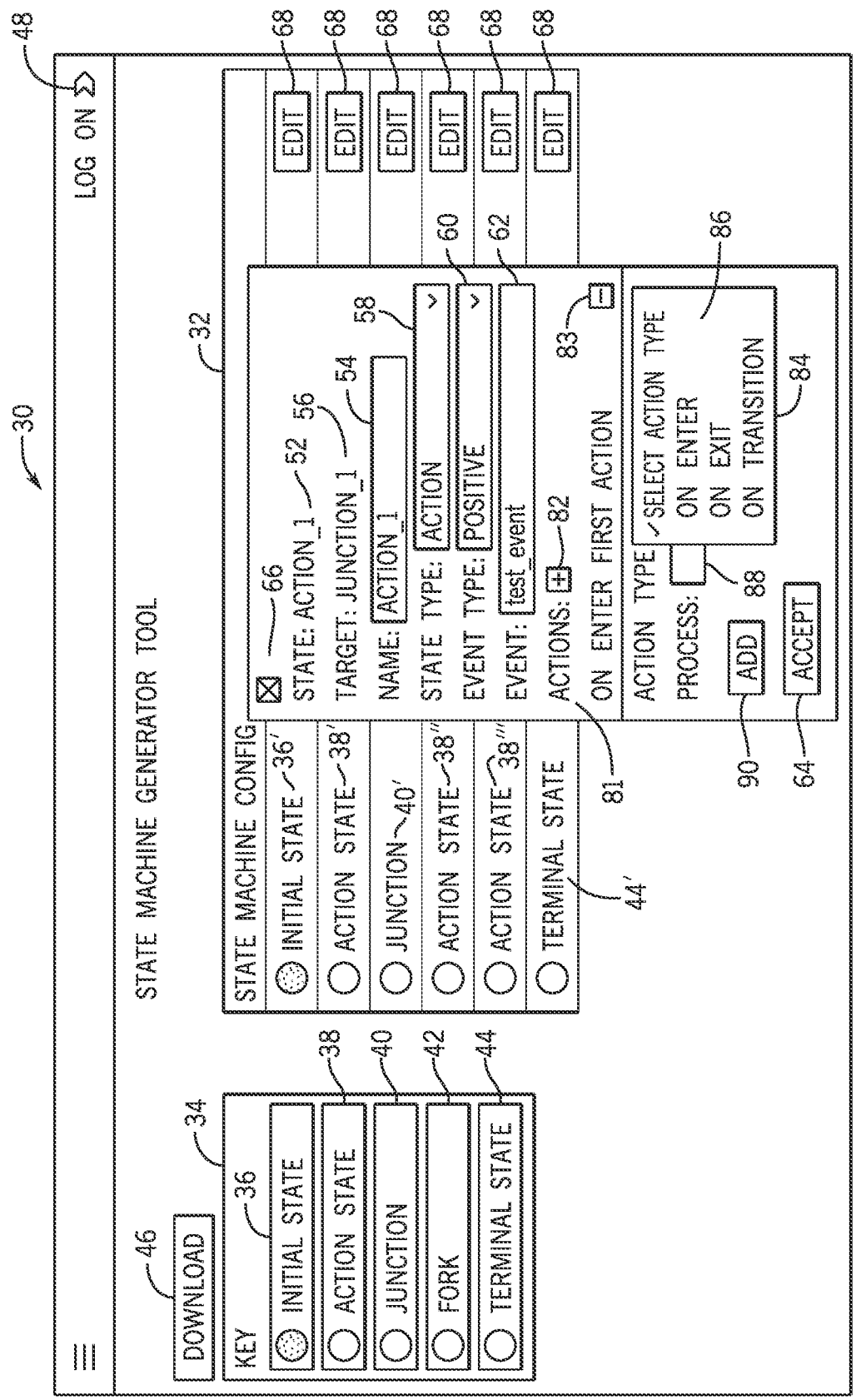
FIG. 4 illustrates an example action state configuration window for an action state of the example state machine configuration displayed in the GUI of the state machine generation client, in accordance with an embodiment.

As discussed above the action state 38 is the state where one or more routines and/or subroutines may be executed at a particular point in time during execution of the respective action state 38 in the state machine. With the foregoing in mind, FIG. 4 illustrates an example action state configuration window 80 for the action state 38' of the example state machine configuration displayed in the GUI 30 of the state machine generation client computer 14.

Similar to the example initial state configuration window 50 of FIG. 3, the example action state configuration window 80 may include multiple graphical interactive elements enabling a developer to set configuration settings of the corresponding state. The example action state configuration window 80 may include the state name 52 and the text field input element 54 to change the state name 52. As mentioned above, the state name 52 may be automatically generated based on the existing state configuration (e.g., action type and position). By way of example, in accordance with the nomenclature previously discussed, the action state 38 has the name "ACTION_1", since the action state 38 configured in FIG. 4 is a first state following the initial state 36. As mentioned above, in some embodiments, the state machine generation client computer 14 may automatically generate the state names 52 of action states based on the order of states within a current state machine configuration. The state names 52 may automatically change based on a re-arrangement of the order of states.

The example action state configuration window 80 may include a target 56. The target 56 may automatically be set to directly subsequent state in the state machine configuration. By way of example, in the example state machine configuration of FIG. 4, the target 56 of the action state 38' is a subsequent junction 40' (e.g., named "JUNCTION_2"). The target 56 may be updated based on any changes may to the state name 52 of the subsequent state and/or any changes made to the structure of the state machine from re-arrangement of the subsequent states.

The example action state configuration window 80 may include the state type menu 58 with selection based interactive elements for selecting the type of state. The types of state may include, but are not limited to, action, fork, and junction states. In some embodiments, the type of state may be automatically selected to reflect which state from the state key 34 was selected when adding the state corresponding to the action state configuration window 80.

The example action state configuration window 80 may include the event type menu 60 with selection based interactive elements for selecting the type of event. In some embodiments, the types of events may include the positive event or the negative event. The positive event is triggered upon fulfillment of one or more parameters and the negative event is triggered upon lack of fulfillment of the one or more parameters.

The example action state configuration window 80 may include the text field input element "Event" 62 to enter the event name when the action state 38 is reached. That is, the event name may be a general description of the outcomes of executed routines and/or subroutines. The "Accept" button 64 may be selected to submit changes made to the configurations of the action state 38. An interactable icon 66 may close the example action state configuration window 80 when selected.

The example action state configuration window 80 may further include a menu header "Actions" 81 and an interactable icon 82 for adding one or more actions in the action state 38. The action is the routine and/or the subroutine executed at a particular moment during the execution of the example state machine configuration. Once the interactable icon "Actions" 82 is selected, an example action window 84 may open. The example action window 84 may include an action type menu 86 with selection based interactive elements for selecting a type of action. The types of actions may include execution on entrance into the action state 38, on exit of the action state 38, and/or on transition into the action state 38. In some embodiments, only one action type may be selected.

The example action window 84 may include a text field input element "Process" 88 to input a name of the routine and/or subroutine to be executed based on the action type selected in the action type menu 86. In some embodiments, the name of the routine and/or subroutine entered in the text field element "Process" 88 may allow the code implementation system 16 to retrieve the routine and/or subroutine with the same name from the code repository 18. The developer may select an interactable icon "Add" 90 to submit the action created in the example action window 84 under the "Actions" 81. The developer may remove any action from the "Actions" 81 by selecting an interactable icon 83.

As described above, the junction 40 is the state where a process is performed to determine which state the state machine may transition to next. By way of example, the junction 40 may run a first process for determining if a phone call has been received. If the phone call is received, then the junction 40 may transition to a first state. If the phone call is not received, the junction 40 may immediately transition to the next state in the order of the example state machine configuration or run a second process to determine if a text message has been received and transition to a second state if the text messaged was received.

Figure 5:
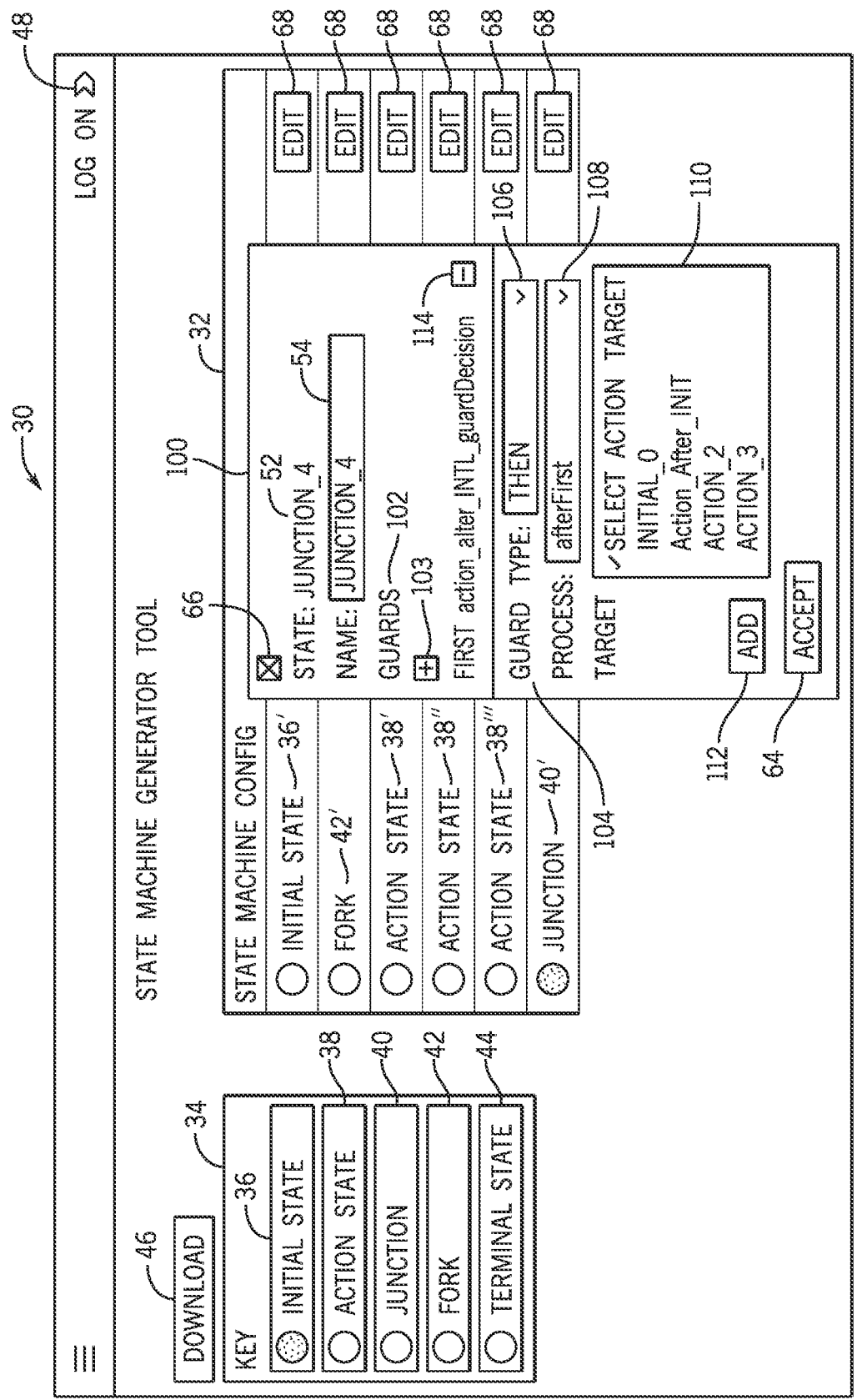
FIG. 5 illustrates an example junction configuration window for a junction of the example state machine configuration displayed in the GUI of the state machine generation client, in accordance with an embodiment.

With the foregoing in mind, FIG. 5 illustrates an example junction configuration window 100 for the junction 40' of an example state machine configuration displayed in the GUI 30 of the state machine generation client computer 14. Similar to the example initial state configuration window 50 and example action state configuration window 80 of FIGS. 3 and 4, respectively, the example junction configuration window 100 may include multiple graphical interactive elements for configuring the current state. The example junction configuration window 100 may include the state name 52 and the text field input element 54 to change the state name 52. In some embodiments, the state name 52 is automatically generated based on the existing state configuration. By way of example, the junction 40 may have the name "JUNCTION_4" since the junction 40' undergoing configuration in FIG. 5 is a fourth state after the initial state 36 in the example state machine configuration. It is important to note that in the illustrated example, the junction 40' appears to be in position 5. However, it is actually in position 4 as action states 38' (which may be labeled ACTION_2a based upon being a first state at a same level as another state) and 38" (which may be labeled ACTION_2b based upon being a second state at a same level as another state) flow from fork 42' and are, thus, at the same level. Action state 38''' is at the third level, flowing into junction 40' on the fourth level, resulting in the automated name being "JUNCTION_4." Thus, as illustrated here, in some embodiments, the state machine generation client computer 14 may automatically generate the state names 52 of the junctions 40 based on the order of states within the current state machine configuration, taking into account that multiple states could be at a common level (e.g., due to an action of a junction 40 and/or an action of a fork 42). The state names 52 may automatically change based on a re-arrangement of the order of states.

The example junction configuration window 100 may further include a menu header "Guards" 102 and an interactable icon 103 for adding one or more guards in the junction 40. The guard is a process run in a particular order during execution of the junction 40 to determine the next state to transition in the example state machine configuration. The one or more guards may be viewed as actions which execute to determine the fulfillment of one or more parameters rather than the execution of the routine and/or subroutine that make up the application.

Once the interactable icon "Guards" 102 is selected, an example guard window 104 may open to create the guard. The example guard window 104 may include a guard type menu 106 with selection based interactive elements for selecting a type of guard. The type of guards may include a "first" guard, a "then" guard, and an "end" guard. There may only be one "first" guard, and the "first" guard may always be selected before the other types of guards. The developer may select one or more "then" guards to execute after the "first" guard. Finally, the developer may select one "end" guard to execute after the "first" guard and/or the one or more "then" guards.

The example guard window 104 may include a text field input element "Process" 106 input the name of the routine and/or subroutine to be executed to determine which state may be transitioned to next. In some embodiments, the name (annotation) of the routine and/or subroutine entered in the text field element "Process" 108 may allow the code implementation system 16 to retrieve the routine and/or subroutine with the same name (annotation) from the code repository 18.

The example guard window 104 may include junction target menu "Target" 110 (referred to as a target 110) with selection based interactive elements for selecting a target state to transition to if the process of the respective guard returns as a positive result. That is, if the routine and/or subroutine run during the respective guard returns the desired result, the junction 40 may indicate to transition to the state selected in the target 110.

The developer may select an interactable icon "Add" 112 to submit the guard created in the example guard window 104 under the "Guards" 102. The developer may remove any guard from the "Guards" 102 by selecting an interactable icon 114. In some embodiments, removing the guard may shift up the other guards to a higher order. By way of example, removing the "first" guard may change the subsequent "then" guard to become the "first" guard.

As discussed above, the fork 42 is the state where the state machine may execute one or more actions simultaneously. That is, the fork 42 may include to one or more actions executing simultaneously or nearly simultaneously. The one or more actions following the fork 42 may transition to the same end point (e.g., a subsequent state in the state machine).

Figure 6:
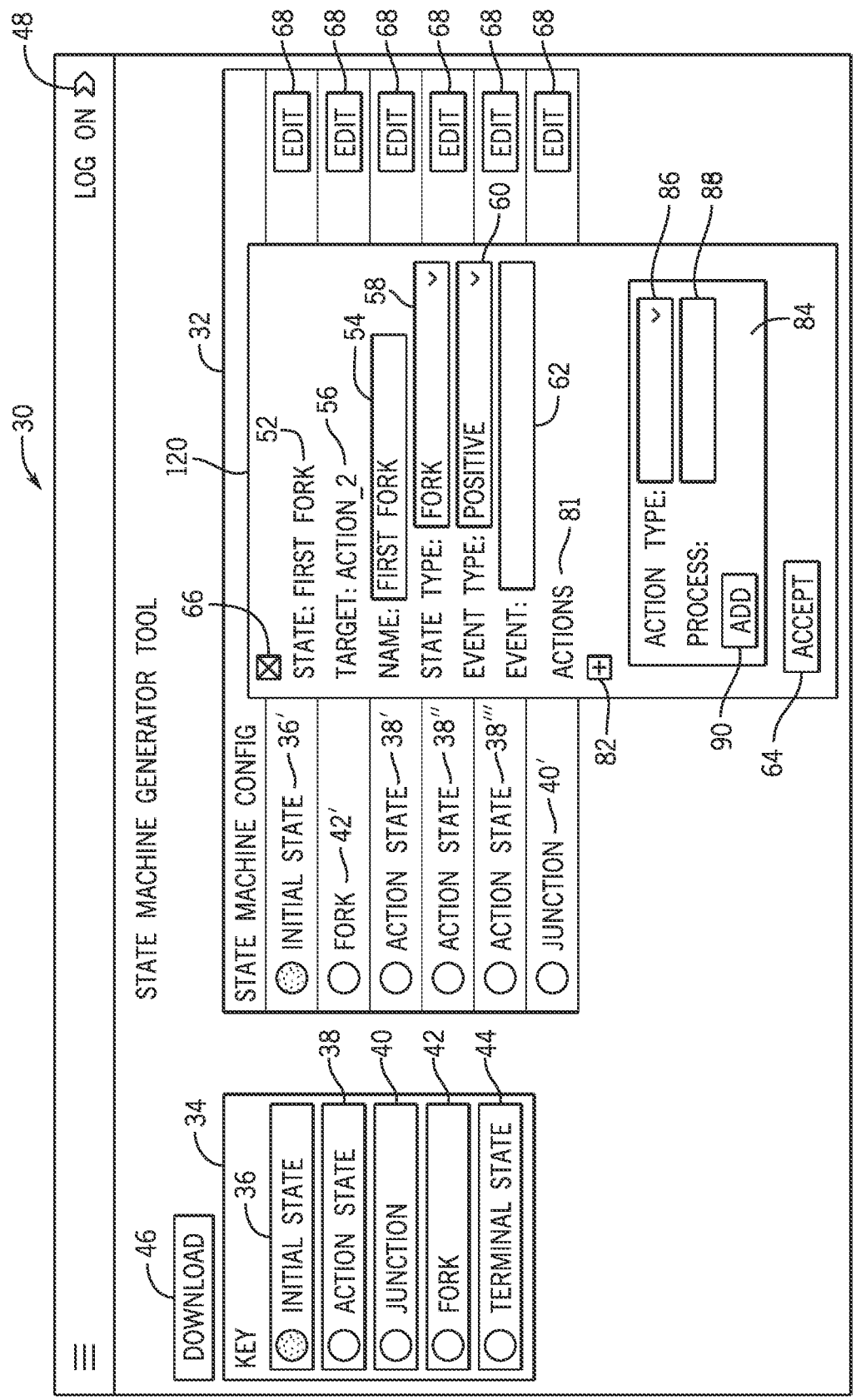
FIG. 6 illustrates an example fork configuration window for a fork of the example state machine configuration displayed in the GUI of the state machine generation client, in accordance with an embodiment.

With the foregoing in mind, FIG. 6 illustrates an example fork configuration window 120 for the fork 42' of an example state machine configuration displayed in the GUI 30 of the state machine generation client computer 14 of FIG. 6. Similar to example configuration windows of FIGS. 3, 4, and 5, the example fork configuration window 120 may include multiple graphical interactive elements for configuring the corresponding state. The example fork configuration window 120 may include the state name 52 and the text field input element 54 to change the state name 52. In some embodiments, the state name 52 is automatically generated based on the existing state configuration. By way of example, the fork 42 may have the name "FORK_2", which may be a user-specified name for the fork 42 undergoing configuration in FIG. 6.

In some embodiments, upon a user-specified name being provided for any given state, that user-specified name will be retained over the nomenclature rules for automatic naming of the state. For example, changing the order of the fork 42' will not result in an adjustment to the name, even though the automatic naming nomenclature would result in such a change for auto-named states. This may be the case for any states provided in the state machine configuration.

The example fork configuration window 120 may include the target 56. The target 56 may automatically be set to a subsequent state in the state machine configuration. By way of example, in the example state machine configuration of FIG. 6, the target 56 of the fork 42 is a subsequent action state 38 (e.g., state Action_2 in FIG. 6). The target 56 may be updated based on any changes may to the state name 52 of the subsequent state and/or any changes made to the structure of the state machine from re-arrangement of the subsequent states.

The example fork configuration window 120 may include the state type menu 58 with selection based interactive elements for selecting the type of state. In some embodiments, the type of state may be automatically selected to reflect which state from the state key 34 is actively being configured. The example fork configuration window 120 may include the event type menu 60 with selection based interactive elements for selecting the type of event. In some embodiments, the types of events may include the positive event or the negative event. The positive event is triggered upon fulfillment of one or more parameters and the negative event is triggered upon lack of fulfillment of the one or more parameters.

The example fork configuration window 120 may include the text field input element "Event" 62 to enter the event name when the fork 42' is reached. That is, the event name may be a general description of the outcomes of executed routines and/or subroutines. The example fork configuration window 120 may further include a menu header "Actions" 81 and an interactable icon 82 for adding one or more actions in the fork 42'. The action is the routine and/or subroutine executed at a particular moment during the execution of the example state machine configuration. Once the interactable icon "Actions" 82 is selected, the example action window 84 may open. The example action window 84 may include an action type menu 86 with selection based interactive elements for selecting the type of action. The types of actions may include execution on entrance into the fork 42', on exit of the fork 42', and/or on transition into the fork 42'. In some embodiments, only one action type may be selected.

Multiple action types and the respective actions may execute simultaneously. By way of example, the developer may select two actions that are both run on entrance into the fork 42 and two actions that both run on exit from the fork 42. That is, the fork 42' may diverge into one or more actions and converge into the state listed as the target 56. The "Accept" button 64 may be selected to submit changes made to the configurations of the fork 42'. An interactable icon 66 may close the example fork configuration window 120 when selected.

Figure 7:
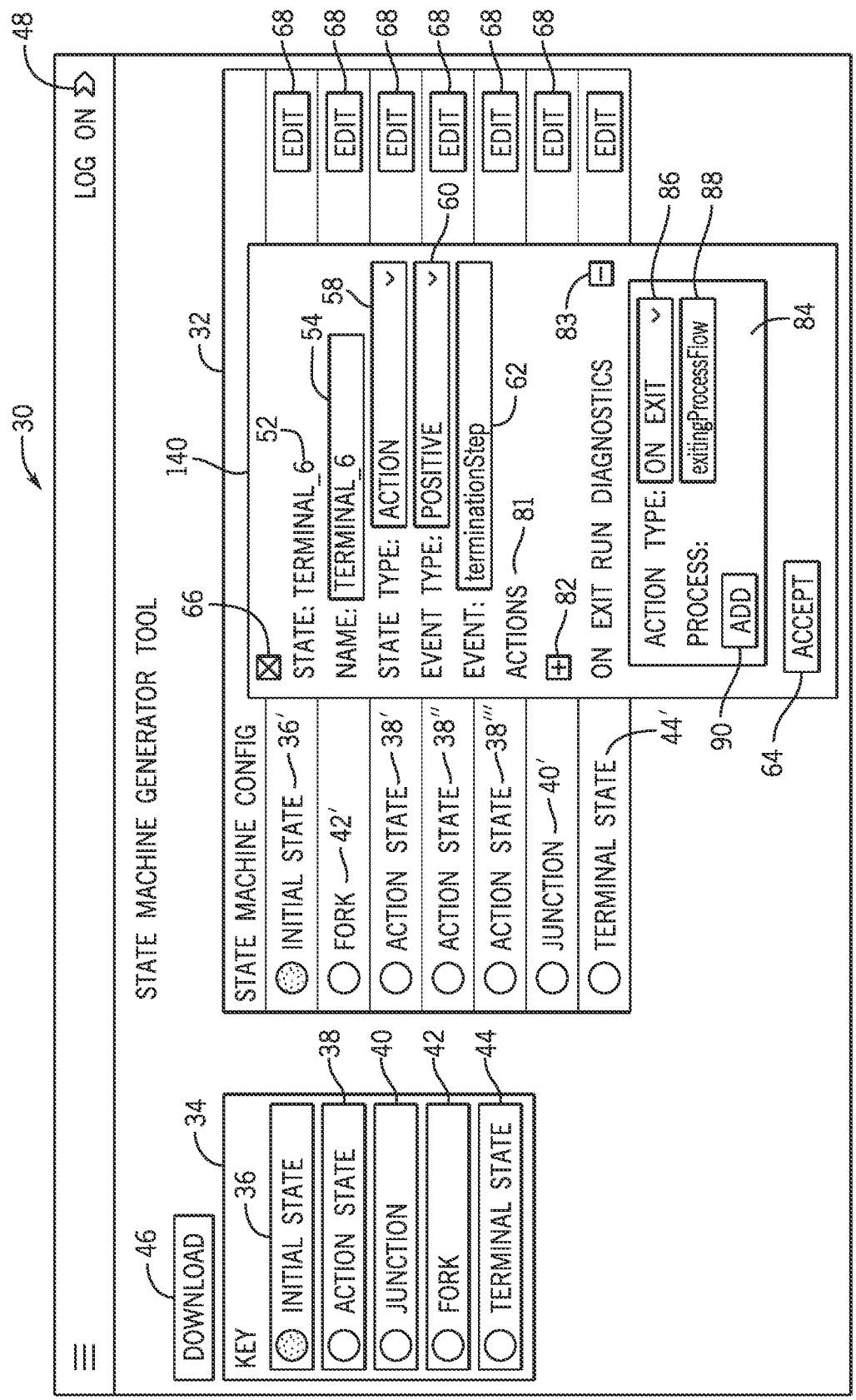
FIG. 7 illustrates an example terminal state configuration window for a terminal state of the example state machine configuration displayed in the GUI of the state machine generation client, in accordance with an embodiment.

As discussed above, the terminal state 44 is the final state of the state machine. The terminal state 44 may contain the routine and/or subroutine that is executed at a particular point in time during execution of the state machine. The terminal state 44 may execute the routine and/or subroutine on entrance into the state, on exit from the state, or transitioning within the state. With the foregoing in mind, FIG. 7 illustrates an example terminal state configuration window 140 for the terminal state 44 of an example state machine configuration displayed in the GUI 30 of the state machine generation client computer 14.

Similar to example configuration windows of FIGS. 3, 4, and 5, the example terminal state configuration window 140 may include multiple graphical interactive elements for configuring the corresponding state. The example terminal state configuration window 140 may include the state name 52 and the text field input element 54 to change the state name 52. In some embodiments, the state name 52 is automatically generated based on the existing state configuration. In some embodiments, the state machine generation client computer 14 may automatically generate the state names 52 of the terminal state 44' based on the order of states within the current state machine configuration. By way of example, the terminal state 44' may have the name "TERMINAL STATE_6" since the terminal state 44' undergoing configuration in FIG. 6 is a sixth state after the initial state 36 in the example state machine configuration. The state names 52 may automatically change based on a re-arrangement of the order of the states.

The example terminal state configuration window 140 may include the state type menu 58 with selection based interactive elements for selecting a type of state. The types of state may include, but are not limited to: action, fork, and junction states. In some embodiments, the type of state may be automatically selected to reflect which state from the state key 34 is actively being configured.

The example terminal state configuration window 140 may include the event type menu 60 with selection based interactive elements for selecting the type of event. In some embodiments, the types of events may include the positive event or the negative event. The positive event is triggered upon a fulfillment of one or more parameters and the negative event is triggered upon lack of fulfillment of the one or more parameters.

The example terminal state configuration window 140 may include the text field input element "Event" 62 to enter the event name when the terminal state 44 is reached. That is, the event name may be a general description of the outcomes of executed routines and/or subroutines. The "Accept" button 64 may be selected to submit changes made to the configurations of the terminal state 44. An interactable icon 66 may close the example terminal state configuration window 140 when selected.

The example terminal state configuration window 140 may further include a menu header "Actions" 81 and an interactable icon 82 for adding one or more actions in the terminal state 44. The action is the routine and/or the subroutine executed at a particular moment during the execution of the example state machine configuration. Once the interactable icon "Actions" 82 is selected, an example action window 84 may open. The example action window 85 may include an action type menu 86 with selection based interactive elements for selecting a type of action. The types of actions may include execution on entrance into the terminal state 44, on exit of the terminal state 44, and/or on transition into the terminal state 44. In some embodiments, only one action type may be selected.

The example action window 84 may include a text field input element "Process" 88 to input a name of the routine and/or subroutine to be executed based on the action type selected in the action type menu 86. In some embodiments, the name of the routine and/or subroutine entered in the text field element "Process" 88 may allow the code implementation system 16 to retrieve the routine and/or subroutine with the same name from the code repository 18. The developer may select an interactable icon "Add" 90 to submit the action created in the example action window 84 under the "Actions" 81. The developer may remove any action from the "Actions" 81 by selecting an interactable icon 83.

Figure 8:
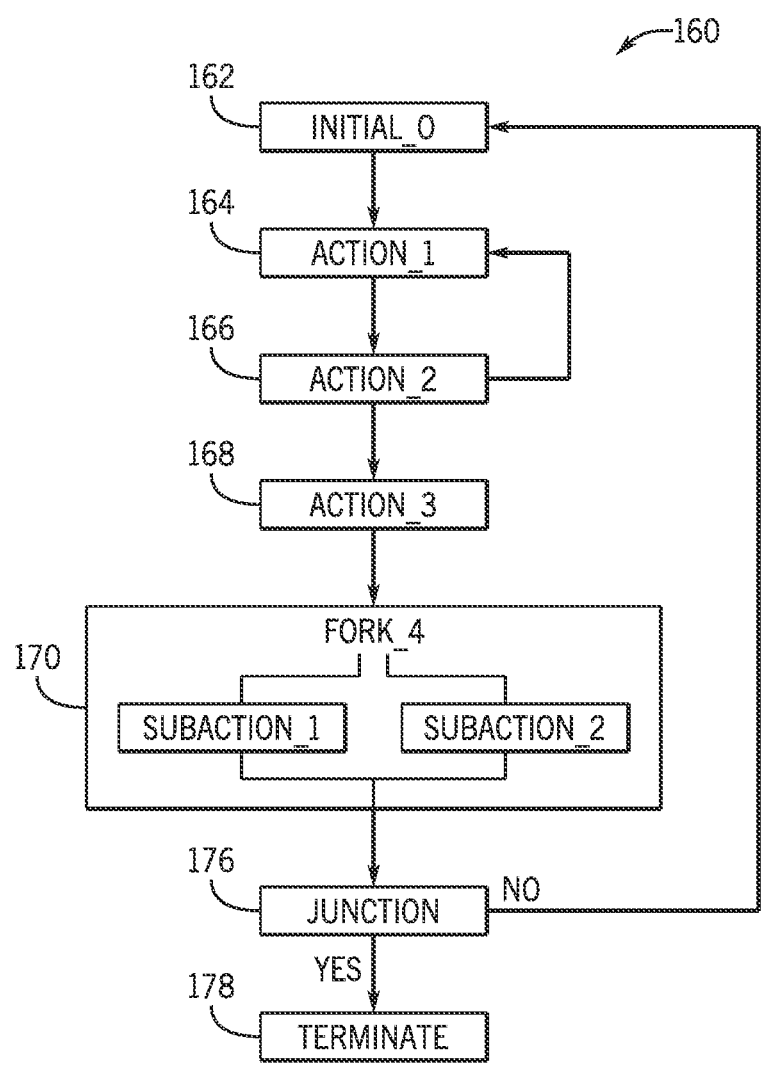
FIG. 8 illustrates an example state machine flowchart, rendered to provide a graphical overview of states and flow of a state machine, in accordance with an embodiment.

In some embodiments, the state machine generation client computer 14 may render for display a completed state machine configuration as a flowchart to illustrate the transition between states in the state machine. With the foregoing in mind, FIG. 8 illustrates an example state machine flowchart 160.

An intital_0 state 162 is the first state in the example state machine flowchart 160. The initial_0 state 162 may transition to action_1 state 164, where one or more actions in the action_1 state 164 are executed either on entering, during, or during transition out of action_1 state 164 based on the action type selected for each action.

The action_1 state 164 may transition to junction_2 166. The junction_2 166 may run a first junction process to determine if parameters are met to transition to action_3 state 168. If the parameters are not met, the junction_2 166 may transition back to the action_1 state 164. Otherwise, when the parameters are met, the junction_2 166 may transition to action_3 168.

Upon transitioning to action_3 state 168, the one or more actions in the action_3 state 168 are executed either on entering, during, or during transition out of action_3 state 168 based on the action type selected for each action. After this, the action_3 state 168 may transition to fork_4 170. The fork_4 170 may include subaction_1 172 and subaction_2 174 executing simultaneously or nearly simultaneously. In some embodiments, as discussed above, these subactions could be denoted as 4a and 4b as they are on the level of fork_4 170. After both the sub-action_1 172 and the sub-action_2 174 execute, the fork_4 170 may transition to junction_7 176.

The junction_5 176 may run a second junction process to determine if parameters are met to transition to terminal state 178. If the parameters are not met, the junction_7 176 may transition to the initial_0 state 162. Otherwise, if the parameters are met, the junction_5 176 state may transition to the terminal state 78 (terminal_6). In the terminal state 178, the state machine is completed and a final one or more actions may be executed.

Figure 9:
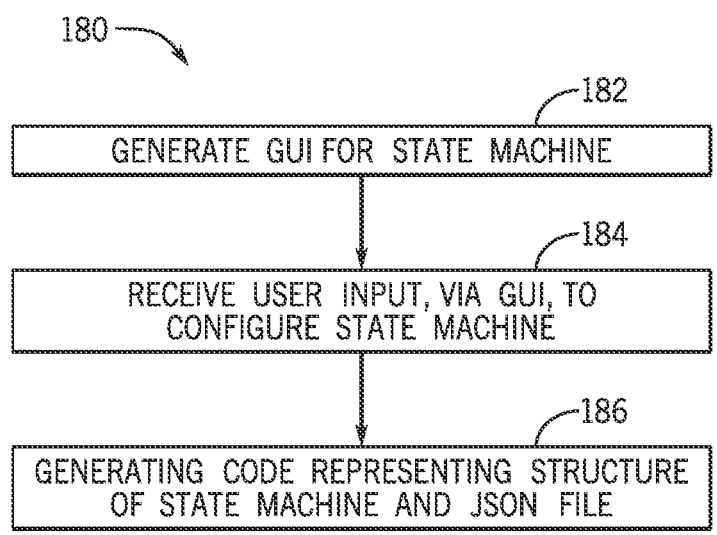
FIG. 9 illustrates a flow chart of a process for creating and generating the example state machine configuration, in accordance with an embodiment.

As described above, a state machine may be configured and generated by a developer utilizing the state machine generation client computer 14. With the foregoing in mind, FIG. 9 illustrates a flow chart of a process 180 for creating and generating the example state machine configuration. In some embodiments, the process 180 may be performed by code implementation system 16. Alternatively, the process 180 could be performed by any suitable processor. Moreover, although the process 180 is described in a particular order, it should be noted that the process 180 may be performed in any suitable order.

At block 182, the state machine generation client computer 14 may generate the GUI 30 for configuration of the state machine. In some embodiments, the state machine generation client computer 14 may generate the GUI 30 for view in an external web application in a secured browser of a developer client computer 12. In other embodiments, the state machine generation client computer 14 may generate the GUI 30 in the state machine generation client computer 14 on a local network.

At block 184, the state machine generation client computer 14 may receive user input, via the GUI 30, to configure the state machine. The state machine generation client computer 14 may receive the user input from an external device (e.g., a mouse and/or keyboard), a touch screen, and/or an external data drive. In some embodiments, the state machine generation client computer 14 may receive inputs automatically from an application running on the same system as the state machine generation client computer 14 and/or an external system running the application.

At block 186, the state machine generation client computer 14 may generate the structural code representing the structure of the configured state machine and an accompanying computer instructions stored on a computer readable medium, such as a JSON file stored on a hard drive. Furthermore, the state machine generation client computer 14 may generate the one or more associated code implementation files and an accompanying computer instructions stored on a computer readable medium, such as a JAVA file stored on a hard drive. The generated structural code and associated code implementation files may be stored in a local memory storage and/or in cloud-based memory storage. In some embodiments, the generated code and associated code implementation files may be exported directly into the code implementation system 16.

The developer may use the code implementation system 16 and the code repository 18 to configure and implement the routines and/or subroutines of the application into the state machine. In some embodiments, the code implementation system 16 may implement the processes of the one or more actions in the one or more states by linking the one or more code implementation files to service code stored in the code repository 18 to insert routines and/or subroutines into correct locations in the generated associated code implementation files. That is, each routine and/or subroutine may be associated with one or more states in the generated structural code.

As discussed above, the generated code may be a JSON file that represents the structure of the state machine. With the foregoing in mind, FIG. 10 illustrates example generated code 200 for a configured state machine on the code implementation system 16. The generated code may include an initial state code block 202, a state's code block 204, a junction's code block 206, a fork's code block 208, and/or a terminal state code block 210.

The states code block 204 may list the state name 52, the target 56, a selection from the state type menu 58, the "Event" 62, a selection from the event type menu 60, and the actions 81 of each state. This may include previously listed configuration information and actions of all states between the initial state 36 and the terminal state 44. The actions 81 of each state in the state's code block 204 may include the process 88 and a selection from the action type menu 86. As described above, the process 88 of each state may link to the one or more associated code implementation files, where the one or more associated code implementation files are linked to the code repository 18 via the code implementation system 16.

The junction's code block 206 may include the state name 52 and each guard 102. Within each guard 102 in the junction's code block 206, the guards 102 may include the target 110 of the respective guard 102, the guard type menu 106, and the "Process" 108 of the guard 102. The junction's code block 206 may include one or more guards 102.

The fork's code block 208 may include the state name 52 and the actions 81 of each state. This may include previously listed configuration information and actions of the initial state 36 and the terminal state 44. The actions 81 of each state in the state's code block 204 may include the process 88 and the selection from the action type menu 86. As described above, the process 88 of each state may link the one or more associated code implementation files, where the one or more associated code implementation files are linked to the code repository 18 via the code implementation system 16.

As discussed above, the one or more associated code implementation files may be a JAVA file linked to the process 88 from the actions 81 of each state. Furthermore, the one or more associated code implementation files may be linked to the code repository 18 via the code implementation system 16 such that code from the code repository is inserted in the correct locations based on the structural code of the state machine.

It should be noted that traditional state machine configuration has an obtuse structure that does not provide the generated structure (e.g., a skeleton and separate functionality tied to the skeleton), which may lead to significant readability issues and added complexity in coding and configuring a state machine. In the present embodiments, the functional code is separated from the state machine defined in the skeleton, which is new and done in an automated fashion, as such there is very little input from the developers other than interaction with the GUI.

Figure 11:
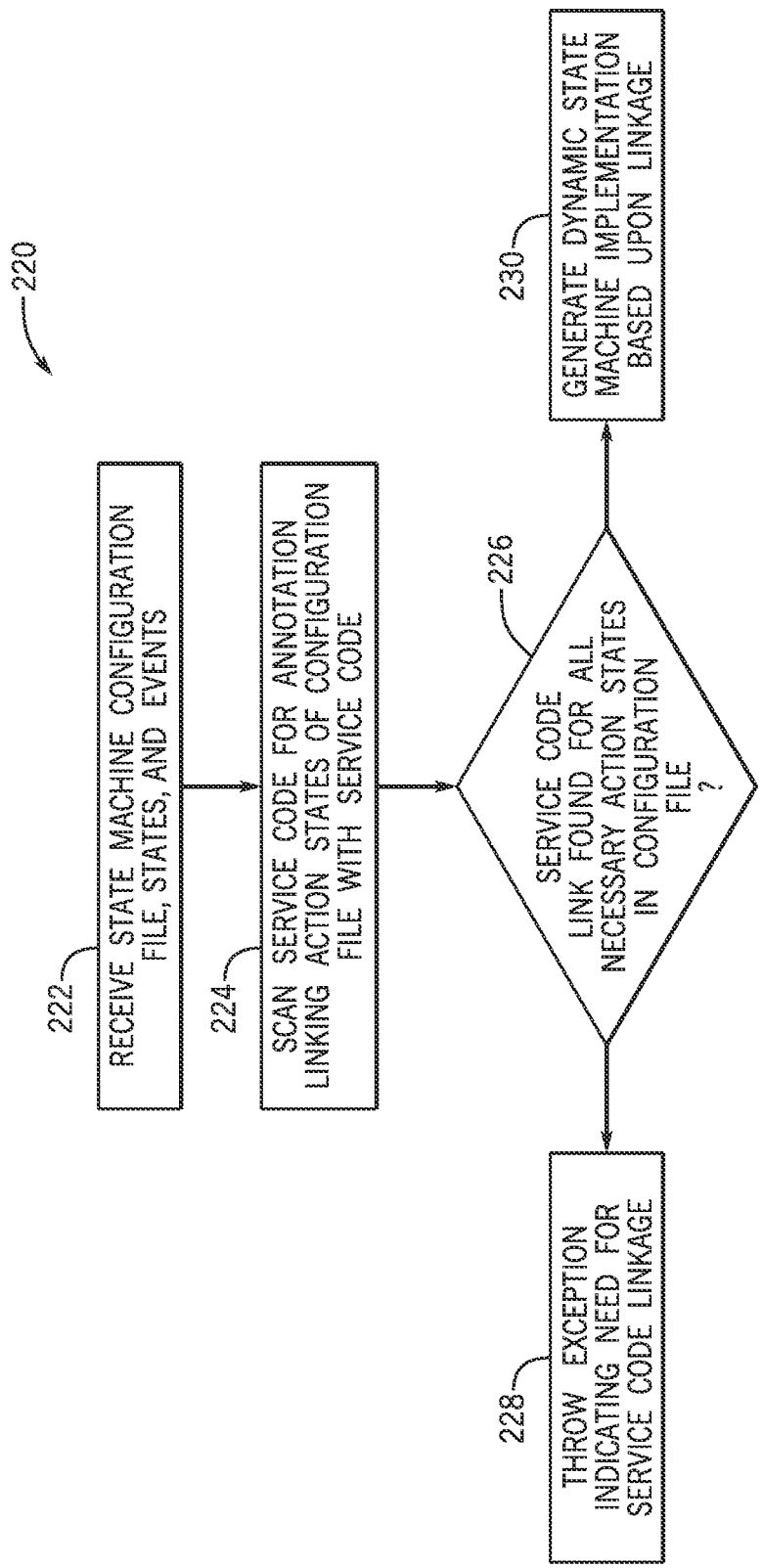
FIG. 11 illustrates a flow chart of a process for implementing an associated code implementation file representative of the actions of one or more states in the configured state machine, in accordance with an embodiment.

With the foregoing in mind, FIG. 11 illustrates a flowchart of a process 220 for implementing an associated code implementation file representative of the actions of one or more states in the configured state machine. In some embodiments, the process 220 may be performed by code implementation system 16. Alternatively, the process 220 could be performed by any suitable processor. Moreover, although the process 220 is described in a particular order, it should be noted that the process 220 may be performed in any suitable order.

Referring now to FIG. 11, at block 222, the code implementation system 16 may receive state machine configuration data from the state machine generation client computer 14. The state machine configuration data may include the one or more associated code implementation files and/or the state machine skeleton. In some embodiments, the code implementation system 16 may receive the state machine configuration data from the developer client computer 12.

At block 224, the code implementation system 16 may scan the code repository 18 for annotations representative of service code and link one or more actions 81 in the one or more associated code implementation files with the service code. By way of example, the code implementation system 16 may scan the one or more associated code implementation files, identify one or more annotations (e.g., process 88). The code implementation system 16 may scan service code stored in the code repository 18 for similar and/or identical annotations representative of the one or more actions and link the identified annotations to respective service code. An example of service code with an annotation related to the annotation of the process 88 in the states code block 204 ("Background_Check") is shown below:

```
@StateAction(action="Background_Check")
public static Action<StateMachineStates,
  StateMachineEvents>Background_Check( ){
    return context→{
      log.info(s:"***RAN         BACKGROUND
        CHECK***");
    };
}
```

The developer client computer 12 may request the code implementation system 16 to extend the current scan to an external library, such as a Spring Library. That is, the code implementation system 16 may extend its current library to include the external library for linking the one or more associated code implementation files. Below is example code for the extension of the current library:

public class BasicExampleStateMachineOrder extends BaseStateMachineFactory
        <StateMachineStates, StateMachineEvents>;
    private StateMachineAnnotationConfig stateMachineAnnotationConfig;
    public BasicExampleStateMachineOrder (StateMachineAnnotationConfig
        stateMachineAnnotationConfig) {
        super(stateMachineAnnotationConfig);
    }

That is, when BaseStateMachineFactory is called, the code implementation system 16 may dynamically assemble the state machine code to include process code from new extended library based on the annotations from states and/or events generated by the state machine generation client computer 14 in accordance with the state machine configuration files.

At block 226, the code implementation system 16 may determine if the scanning linked all necessary actions in the associated code implementation file to respective service code from the code repository 18. In some embodiments, the necessary actions may be associated with the actions 81 of the initial state 36, the one or more action states 38, the one or more junctions 40, the one or more forks 42, and/or the terminal state 44.

If the code implementation system 16 did not link all of the necessary actions in the associated code implementation file, at block 228, the code implementation system 16 may transmit an error code indicative of one or more erroneous and/or missing annotation(s). The developer client computer 12 may extend the current library, modify the existing state machine configuration data via the state machine generation client computer 14, and/or initiate a re-scan of the code repository 18 and any additional external libraries. In some embodiments, the code implementation system 16 may re-scan the state machine configuration data (e.g., the state machine skeleton and/or the one or more associated code implementation files) and identify annotations where misspellings, associated synonyms, and/or other errors in operator input may have occurred.

If the code implementation system 16 did link all of the necessary actions in the associated code implementation file, at block 230, the code implementation system 16 may generate a dynamic state machine implementation based at least upon the linkage between the service code and the one or more associated code implementation files. The dynamic state machine implementation represents a completed state machine that may undergo testing to determine the validity of the state machine.

Figure 12:
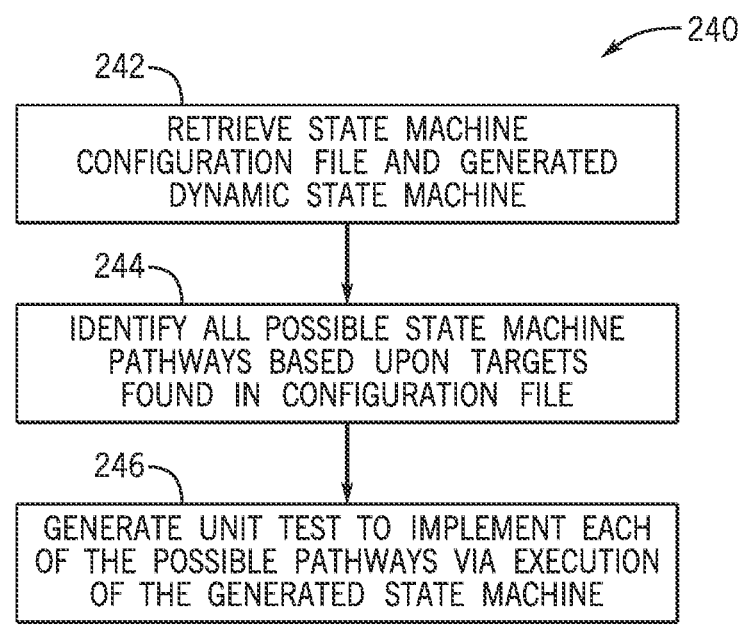
FIG. 12 illustrates a flower chart of a process for generating test files to test the configured state machine, in accordance with an embodiment.

With the foregoing in mind, FIG. 12 illustrates a flowchart of a process 240 for generating test files to test the configured state machine. In some embodiments, the process 240 may be performed by code implementation system 16. Alternatively, the process 240 could be performed by any suitable processor. Moreover, although the process 240 is described in a particular order, it should be noted that the process 240 may be performed in any suitable order.

Referring to FIG. 12, at block 242, the code implementation system 16 may retrieve the state machine configuration file (e.g., the one or more associated code implementation files and/or the state machine skeleton) and the generated dynamic state machine implementation of FIG. 11. In the event that there is no generated dynamic state machine implementation, the code implementation system 16 may perform the process 220 of FIG. 11.

At block 242, the code implementation system 16 may identify all possible state machine pathways based upon targets found in the state machine configuration file. By way of example, the code implementation system 16 may identify one or more pathways in the state machine of FIG. 8. A first pathway may include a path from the initial_0 state 162 to the action_1 state 164 to the junction_2 166 to the action_3 state 168 to the fork_4 170 (and the execution of a subaction_1) to the junction_5 176 to the terminal_6 state 178. A second pathway may include a path from the initial_0 state 162 to the action_1 state 164 to the junction_2 166 to the action_1 state to the junction_2 166 to the action_3 state 168 to the fork_4 170 (and the execution of a subaction_2) to the junction_5 176 to the initial_0 state 162 and back through the first pathway. That is, there may be multiple different pathways through the state machine based on one or more junctions 40 and/or one or more forks 42.

At block 244, the code implementation system 16 may generate unit tests to implement each possible pathway of the state machine via execution of the generated state machine. That is, the code implementation system 16 may repeatedly execute the generated state machine and provide differing inputs on subsequent executions to test each of the identified pathways. The generated unit tests may be associated with the associated code implementation files and/or the state machine skeleton.

By employing the techniques described in the present disclosure, the systems and methods described herein may allow developers flexibility and ease when configuring the structure of the state machine. The system 10 may include the developer client computer 12 interfacing with the state machine generation client computer 14. The state machine generation client computer 14 may provide the GUI 30 with multiple input/selection based and text based graphical interactive elements for configuration and generating the structural code of the state machine. The developer may add, modify, re-arrange, delete, and/or configure one or more states, via the GUI 30, to create the state machine configuration. The state machine generation client computer 14 may export the structural code and the associated code implementation files and accompanying computer-readable mediums (e.g., a JSON file and a JAVA file, respectively) to the code implementation system 16. The developer may use the code implementation system 16 to implement the processes of the one or more actions in the one or more states via linkage between the code repository 18 and the associated code implementation files to insert routines and/or subroutines into correct locations in the generated code implementation files.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A tangible, non-transitory, computer-readable medium, comprising computer-readable instructions that, when executed by one or more processors of a computer, cause the computer to:

generate a GUI for configuration of a state machine, the
configuration comprising generating one or more states
of the state machine and an ordering of the states of the
state machine;

cause the GUI to be rendered at a developer client;

receive user input from the developer client, via the GUI,
to define the one or more states of the state machine and
the ordering of the one or more states of the state
machine; and based upon the user input, generate structural code representative of a structure of the state machine, wherein the generated structural code comprises:
an indication of the defined one or more states;
the ordering of the one or more states;
a name of a respective state of the one or more states;
a target of a respective state of the one or more states,
wherein the target represents a next state subsequent
execution of the respective state;
a type of a respective state of the one or more states,
wherein the type represents a function relative to the
state machine of the respective state;
an event of a respective state of the one or more states,
wherein the event represents a benchmark to determine a current overall goal of the respective state;
an event type of a respective state of the one or more
states, wherein the event type represents a logical
alignment of the respective state; and
an action type of a respective state of the one or more
states, wherein the action represents a point of
execution for a routine or subroutine executed during
the respective state.

2. The tangible, non-transitory, computer-readable medium of claim 1, wherein the one or more states comprise an initial state, one or more action states, one or more fork states, one or more junction states, a terminal state, or any combination thereof.

3. The tangible, non-transitory, computer-readable medium of claim 1, wherein the GUI comprises a state key that presents a list of the defined one or more states of the state machine.

4. The tangible, non-transitory, computer-readable medium of claim 1, comprising computer-readable instructions that, when executed by the one or more processors, cause the computer to:
receive, via the user input, an indication of a movement
interaction comprising a modification to an ordering of
at least one of the one or more states of the state
machine; and
in response to receiving the indication of the movement
interaction, adjust the structure of the state machine to
indicate the modification of the ordering.

5. The tangible, non-transitory, computer-readable medium of claim 1, comprising computer-readable instructions that, when executed by the one or more processors, cause the computer to:
generate one or more associated code implementation
files, wherein the one or more associated code implementation files are associated with the structural code.

6. The tangible, non-transitory, computer-readable medium of claim 5, wherein the developer client is communicatively coupled to a code implementation system and a code repository, wherein the code implementation system is configured to:
receive the structural code and the one or more associated
code implementation files;

determine one or more code segments to retrieve from the
code repository based at least upon the structural code;
and insert the one or more code segments from the code
repository into correct locations in the one or more
associated code implementation files.

7. The tangible, non-transitory, computer-readable medium of claim 6, wherein the structural code is a JSON file and the one or more associated code implementation files are JAVA files.

8. The tangible, non-transitory, computer-readable medium of claim 1, comprising modifying previously generated structural code via the GUI.

9. A method, comprising:
receiving, at a code implementation system, state machine
configuration files indicative of one or more states of a
configured state machine and one or more associated
actions of each state in the configured state machine,
wherein each action is associated with an annotation;
scanning a repository for annotations matching the annotation of respective actions in the configured state
machine;
linking respective actions to identified annotations in the
repository;
determining that the one or more associated actions are
linked;
upon determining that the one or more associated actions
are not linked, transmitting an error code indicative of
one or more erroneous annotations; and
upon determining that the one or more associated actions
are linked, generating a dynamic state machine implementation based at least upon the linkage between
respective actions and the identified annotations in the
repository;
wherein the generated dynamic state machine implementation comprises:
an indication of the one or more states;
an ordering of the one or more states;
a name of a respective state of the one or more states;
a target of a respective state of the one or more states,
wherein the target represents a next state subsequent
execution of the respective state;
a type of a respective state of the one or more states,
wherein the type represents a function relative to the
state machine of the respective state;
an event of a respective state of the one or more states,
wherein the event represents a benchmark to determine a current overall goal of the respective state;
an event type of a respective state of the one or more
states, wherein the event type represents a logical
alignment of the respective state; and
an action type of a respective state of the one or more
states, wherein the action represents a point of
execution for a routine or subroutine executed during
the respective state.

10. The method of claim 9, comprising:
retrieving the state machine configuration file and the
dynamic state machine implementation;
identifying one or more possible state machine pathways
based at least upon one or more targets found in the
state machine configuration file; and
generating a test file to implement each of the possible
state machine pathways via execution of the dynamic
state machine implementation.

11. The method of claim 9, comprising extending the repository to include an external repository, wherein the external repository is a third-party repository.

12. The method of claim 9, wherein the one or more erroneous annotations comprise a mis-spelled annotation, a new annotation, a synonym of the annotation, or any combination thereof.

13. The method of claim 9, wherein the state machine configuration files comprises a state machine structural code and one or more associated code implementation files, wherein the one or more associated code implementation files are associated with the structural code.

14. The method of claim 9, wherein the dynamic state machine implementation is representative of a completed state machine.

15. A system, comprising:
  a developer client computer configured to provide inputs to a state machine generation client to configure a state machine;
  the state machine generation client configured to generate structural code and associated code implementation files representative of the state machine, wherein the state machine generation client comprises:
    a graphical user interface (GUI), wherein the GUI comprises:
      a state machine configuration window displaying a configurable representation of one or more states in the state machine and an ordering of the states of the state machine; and
      a state key listing the one or more states in the state machine; and
  a code implementation system coupled to a code repository, wherein the code implementation system is configured to generate a dynamic state machine implementation based at least upon the generated structural code and associated code implementation files;
  wherein the generated structural code comprises:
    an indication of the one or more states;
    the ordering of the states;
    a name of a respective state of the one or more states;
    a target of a respective state of the one or more states, wherein the target represents a next state subsequent execution of the respective state;
    a type of a respective state of the one or more states, wherein the type represents a function relative to the state machine of the respective state;
    an event of a respective state of the one or more states, wherein the event represents a benchmark to determine a current overall goal of the respective state;
    an event type of a respective state of the one or more states, wherein the event type represents a logical alignment of the respective state; and
    an action type of a respective state of the one or more states, wherein the action represents a point of execution for a routine or subroutine executed during the respective state.

16. The system of claim 15, wherein generating the dynamic state machine implementation comprises:
  receiving, at the code implementation system, the generated structural code and associated code implementation files indicative of one or more states of the state machine and one or more associated actions of each state in the state machine, wherein each action is associated with an annotation;
  scanning the code repository for annotations matching the annotation of respective actions in the state machine;
  linking respective actions to identified annotations in the code repository;
  determining that the one or more associated actions are linked;
  upon determining that the one or more associated actions are not linked, transmitting an error code indicative of one or more erroneous annotations; and
  upon determining that the one or more associated actions are linked, generating the dynamic state machine implementation based at least upon the linkage between respective actions and the identified annotations in the repository.

17. The system of claim 15, wherein the code implementation system is configured to access an external repository to extend the code repository.

18. The system of claim 15, wherein the state machine generation client is configured to generate the GUI for view in an external web application in a secured browser of a developer client.

19. The system of claim 15, wherein the code implementation system is configured to:
  retrieve the state machine configuration file and the dynamic state machine implementation;
  identify one or more possible state machine pathways based at least upon one or more targets found in the state machine configuration file; and
  generate a test file to implement each of the possible state machine pathways via execution of the dynamic state machine implementation.

\* \* \* \* \*